United States Patent [19]

Werner et al.

[11] Patent Number: 4,885,930
[45] Date of Patent: Dec. 12, 1989

[54] GARMENT PRESSURIZING APPARATUS

[75] Inventors: Walter N. Werner, Philadelphia; Jeffrey K. Biscardi, Perkasie; Edward L. McClain, Elkins Park, all of Pa.

[73] Assignee: The United States of America as represented by the Secretary of the Navy, Washington, D.C.

[21] Appl. No.: 238,675

[22] Filed: Aug. 30, 1988

[51] Int. Cl.$^4$ .............................................. G01M 3/02
[52] U.S. Cl. .......................................... 73/37; 2/2.1 A
[58] Field of Search ...................... 73/37, 40; 2/2.1 A

[56] References Cited

U.S. PATENT DOCUMENTS

| | | | |
|---|---|---|---|
| 2,107,922 | 2/1938 | Westin | 73/37 |
| 2,126,434 | 8/1938 | Vosbury . | |
| 2,345,387 | 3/1944 | Elsey . | |
| 2,370,945 | 3/1945 | Fields | 73/37 |
| 3,720,208 | 3/1973 | Aldrich et al. | 2/2.1 A |
| 4,292,839 | 10/1981 | Hartness . | |
| 4,403,608 | 9/1983 | Warncke | 2/2.1 A |
| 4,521,652 | 6/1985 | Durand . | |

Primary Examiner—John Chapman
Assistant Examiner—Michele Simons
Attorney, Agent, or Firm—John M. O'Meara; Susan E. Verona

[57] ABSTRACT

Prior to pressurizing a garment at an opening therein, interior and exterior elements are drawn together along the longitudinal axis of a tube through which the pressurizing gas is applied, to grip the garment around the full periphery of that opening. In one particular embodiment, a means for monitoring pressure within the garment is included in the apparatus to provide for leak testing the garment after it is pressurized.

13 Claims, 2 Drawing Sheets

GARMENT PRESSURIZING APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to apparatus for use in pressurizing garments and more particularly, to such apparatus which can be adapted to facilitate the leak testing of such garments.

Pressurizing apparatus are well known in the art of garment testing, such as the complex designs disclosed and claimed in U.S. Pat. Nos. 2,126,434 and 2,370,945 which have little applicability for any garments other than gloves. Also, known testing concepts have been applied for other items using pressurizing apparatus which is not adaptable to garments, such as are disclosed and claimed in U.S. Pat. No. 2,107,922 for paste dispensing collapsible tubes, U.S. Pat. 2,345,387 for refrigerator cabinets, and U.S. Pat. No. 4,292,839 for screw type bottle caps. Furthermore, some testing concepts involving the pressurization of items have been implemented without any pressurizing apparatus, through visual observation such as is disclosed and claimed in U.S. Pat. No. 4,521,652 for float switches.

SUMMARY OF THE INVENTION

It is the general object of the present invention to provide pressurizing apparatus for garments, which is of simple design and readily utilized with life support suits; and It is a specific object of the present invention to provide pressurizing apparatus in accordance with the above stated general object and which can be modified to perform leak testing.

These and other objects are accomplished using the pressurizing concept of this invention by including internal and external portions on the apparatus thereof, which are drawn together along a tube passing through an opening in the garment to seal off that opening after which gas at a pressure above atmospheric is passed through the tube to pressurize the garment. Means for monitoring the pressure of the gas within the garment is included on the apparatus of this invention when leak testing is to be accomplished therewith.

The scope of the present invention is only limited by the appended claims for which support is predicated on the preferred embodiments hereinafter set forth in the following description and the attached drawings wherein like reference characters refer to like elements throughout the several figures.

DESCRIPTION OF THE PREFERRED EMBODIMENTS

Figure 1:
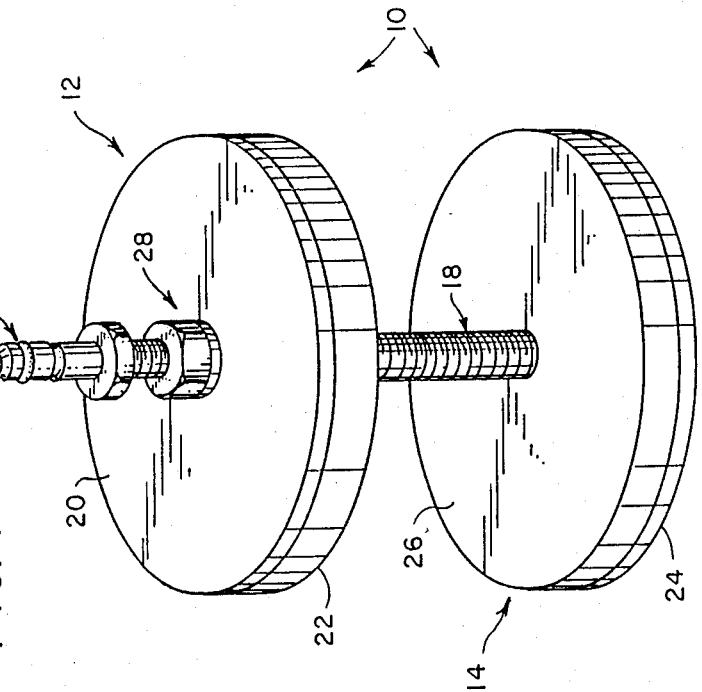
FIG. 1 is an isometric view of pressurizing apparatus in accordance with one preferred embodiment of the invention.

One preferred embodiment of a garment pressurizing apparatus 10 in accordance with this invention, is illustrated in FIG. 1 wherein an external sealing element 12 is variably separable from an internal sealing element 14 along the longitudinal axis 16 of a hollow rod or tube 18. A hole 19 (shown in FIG. 2) is disposed through the center of the exterior element 12 and is sized to provide clearance around the tube 18 which is affixed to and passes through the center of the interior element 14. The external element 12 includes a rigid external plate 20 and a compressible external gasket 22 while the internal element 14 includes a rigid internal plate 24 and a compressible internal gasket 26. Also included in the apparatus 10 are compression means 28 for drawing the exterior and interior elements 12 and 14 together along the axis 16 and check valve means 30 for applying gas to the tube 18 at a pressure above atmospheric.

Figure 2:
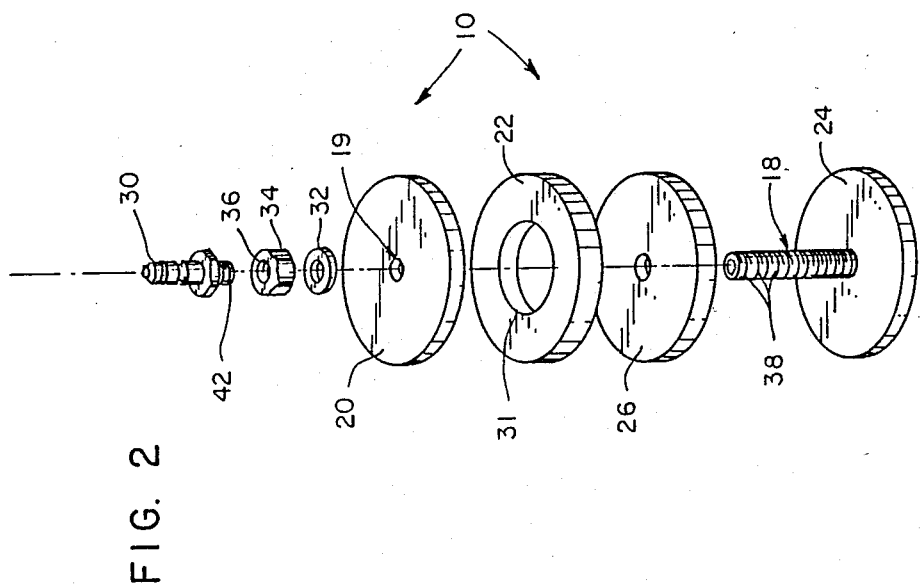
FIG. 2 is an exploded isometric view of the pressurizing apparatus in accordance with another preferred embodiment of the invention.

In FIG. 2, a specific implementation of the FIG. 1 apparatus is illustrated, wherein the tube 18 is affixed to and passes through the center of the interior plate 24. The exterior plate 20, as well as the exterior and interior gaskets 22 and 26, each have a hole through the center thereof, which is sized to clear the tube 18. To provide clearance space between the interior and exterior elements 12 and 14 into which excess or irregular portions on the garment may accumulate, at least one of the gaskets 22 and 26 includes a hole 31 which is enlarged relative to the tube clearance holes. For the sake of convenience when manipulating the apparatus 10, such gaskets with enlarged holes 31 are affixed to their corresponding plates. As the compression means 28, a washer 32 and a nut 34 having female threads 36 which mate with male threads 38 on the tube 18, are utilized. Of course, the compression means 28 could be implemented in many other ways and each implementation could have variations, such as the nut 34 in the implementation selected, could be of the wing nut type to facilitate manual turning thereof. A standard type fitting 30 having male threads 42 which mate with female threads (not shown) within the tube 18 is utilized as the check valve means 30.

Figure 3:
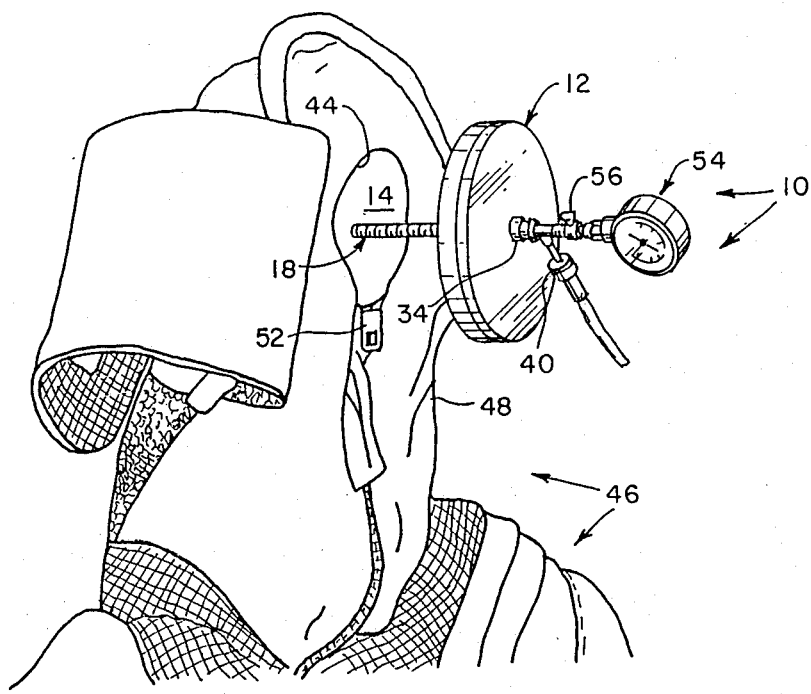
FIG. 3 illustrates pressurizing and testing apparatus in accordance with still another embodiment of the invention and which is disposed relative to a life support suit for use therewith.
Figure 4:
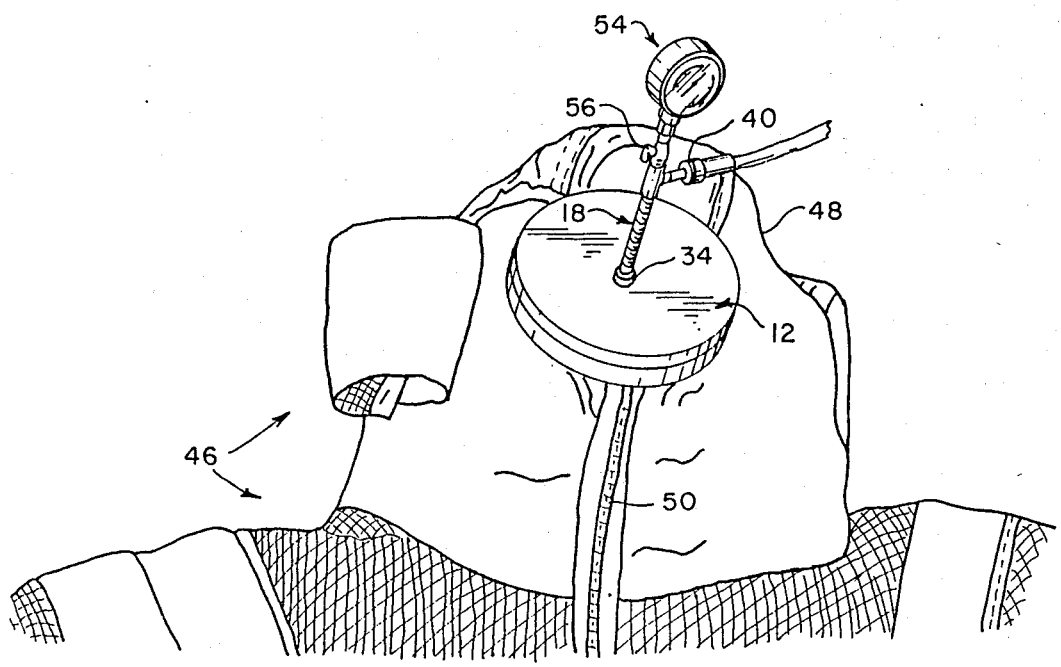
FIG. 4 illustrates the pressurizing and testing apparatus of FIG. 3 in use with the suit.

To pressurize a garment with the apparatus 10, the interior element 14 is disposed through an opening 44 in the garment and on one side thereof, while the exterior element 12 remains disposed on the other side of the garment and separated from the interior element 14 along the longitudinal axis 16 of the tube 18, as shown in FIG. 3. The nut 32 is then manipulated to draw the interior and exterior elements 12 and 14 together with that portion of the garment located about the full periphery of the opening 44 compressed therebetween, as shown in FIG. 4. Then gas at some predetermined pressure level above atmospheric is applied to the check valve 30 and so long as all other openings in the garment have been sealed off, the garment will be pressurized at that predetermined level.

Any garment such as rubber gloves could be pressurized with the apparatus 10, however, the garment shown in FIGS. 3 and 4 is a life support suit 46 having a skin tight hood 48 with the opening 44 disposed therein to expose the facial area. Entry into the suit 46 is made by manipulating a zipper 50 to open the front thereof. One end of the zipper 50 is terminated at the facial opening 44 and the zipper 50 is manipulated manually by gripping a slider 52 thereon. Because the exterior and interior elements 12 and 14 must be configured to extend beyond the facial opening 44 when pressurizing the suit 46 with the apparatus 10, the zipper 50 is manipulated to dispose the interior element 14 through the facial opening 44. Although the opening 44 and the exterior and interior elements 12 and 14 are shown to be substantially circular about the longitudinal tube axis 16, they could have any compatible configuration with the opening 44.

As shown in FIGS. 3 and 4, the apparatus 10 can be readily modified to provide for leak testing of the garment, after it is pressurized. Means 54 for monitoring pressure within the tube 18, such as a conventional gage, is included in the apparatus 10 for this purpose. A stop cock 56 may also be disposed between the gage 54 and the tube 18 for protecting the gage 54 against high surges when pressurizing the garment. Because the pneumatic check valve 40, the gage 54 and the stop cock 56 are all connected at one end of the tube 18, conventional plumbing fittings must be utilized to make the necessary accommodations and depending on the choice of such fittings, the relative orientation of these elements will vary on the modified apparatus 10. Those skilled in the art will realize without any further explanation that the leak testing is performed after the garment is pressurized by observing gage 54 over some predetermined time period and if a constant reading is maintained, there are no leaks in the suit 46. Of course, the leak rate may also be monitored with the modified apparatus 10.

Those skilled in the art will appreciate without any further explanation that many modifications and variations are possible to the above disclosed garment pressurizing apparatus embodiments within the concept of this invention. Consequently, it should be understood that all such modifications and variations fall within the scope of the following claims.

What we claim is:

1. Apparatus for pressurizing a garment, comprising:
   an interior sealing element having a rigid plate and a compressible gasket;
   a tube having a longitudinal axis, said tube being affixed to and passing through the center of said interior element;
   an exterior sealing element having a rigid plate and a compressible gasket, with a hole through the center thereof sized to clear said tube;
   compression means for drawing said interior and exterior elements together along said longitudinal tube axis; and
   check valve means for applying gas to said tube at a pressure above atmospheric;
   said interior and exterior sealing elements being arranged in said apparatus with said gaskets thereof adjacently disposed along said tube and said apparatus being operable at an opening in the garment by manipulating said compression means to grip that portion of the garment located about the full periphery of said opening between said interior and exterior elements while the garment is pressurized.

2. The apparatus of claim 1 wherein at least one of said gaskets includes a hole centrally disposed therethrough and sized to provide clearance space between said interior and exterior elements into which excess and irregular portions on the garment may accumulate.

3. The apparatus of claim 2 wherein at least said gaskets with the clearance space holes are affixed to their corresponding said plates.

4. The apparatus of claim 1 wherein said compression means includes male threads disposed on said tube and a nut having female threads which mate with said male tube threads, said nut being turnable on said tube for a sufficient distance along said longitudinal axis thereof to grip the garment between said interior and exterior elements.

5. The apparatus of claim 1 wherein said check valve means is a standard fitting having male threads which mate with female threads in said tube.

6. The apparatus of claim 1 wherein means for monitoring pressure within the garment is included therein to direct the existence of leaks in the garment by observing a predetermined loss of pressure over a predetermined time period.

7. The apparatus of claim 1 wherein said interior and exterior elements are substantially of circular configuration about said longitudinal tube axis.

8. Leak testing apparatus for a life support suit, comprising:
   an interior element having a rigid plate and a compressible gasket;
   a tube having a longitudinal axis, said tube being affixed to and passing through the center of said interior element;
   an exterior sealing element having a rigid plate and a compressible gasket, with a hole through the center thereof sized to clear said tube;
   compression means for drawing said interior and exterior elements together along said longitudinal tube axis;
   check valve means for applying gas to said tube at a pressure above atmospheric; and
   means for monitoring pressure within the suit;
   said interior and exterior sealing elements being arranged in said apparatus with said gaskets thereof adjacently disposed along said tube and said apparatus being operable at an opening in the suit to detect the existence of leaks therein by observing a predetermined loss of pressure over a predetermined time period after said compression means has been manipulated to grip that portion of the suit located about the full periphery of such opening between said interior and exterior elements and the suit has been pressurized to some predetermined level.

9. The apparatus of claim 8 wherein at least one of said gaskets includes a hole centrally disposed therethrough and sized to provide clearance space between said interior and exterior elements into which excess and irregular portions on the suit may accumulate.

10. The apparatus of claim 9 wherein at least said gaskets with the clearance space holes are affixed to their corresponding said plates.

11. The apparatus of claim 8 wherein said compression means includes male threads disposed on said tube and a nut having female threads which mate with said male tube threads, said nut being turnable on said tube for a sufficient distance along said longitudinal axis thereof to grip the suit between said interior and exterior elements.

12. The apparatus of claim 8 wherein said check valve means is a standard fitting having male threads which mate with female threads in said tube.

13. The apparatus of claim 8 wherein said interior and exterior elements are substantially of circular configuration about said longitudinal tube axis.

* * * * *